PUBLIC ADDRESS SYSTEM FOR SUBWAY TRAINS

Original Filed Sept. 20, 1955 2 Sheets-Sheet 1

INVENTOR
FREDERICK B. WOODWORTH.
ELLSWORTH H. HULTS
BY
ATTORNEY

PUBLIC ADDRESS SYSTEM FOR SUBWAY TRAINS

Original Filed Sept. 20, 1955 2 Sheets-Sheet 2

INVENTOR
FREDERICK B. WOODWORTH.
ELLSWORTH H. HULT
BY
Victor J. Borst
ATTORNEY

United States Patent Office

Re. 24,467
Reissued Apr. 29, 1958

24,467

PUBLIC ADDRESS SYSTEM FOR SUBWAY TRAINS

Frederick B. Woodworth, Garden City, and Ellsworth H. Hults, Baldwin, N. Y., assignors to Smith-Meeker Engineering Company, New York, N. Y., a corporation of New York Original No. 2,773,932, dated December 11, 1956, Serial No. 535,489, September 20, 1955. Application for reissue May 31, 1957, Serial No. 663,572

18 Claims. (Cl. 179—1)

Figure 1:
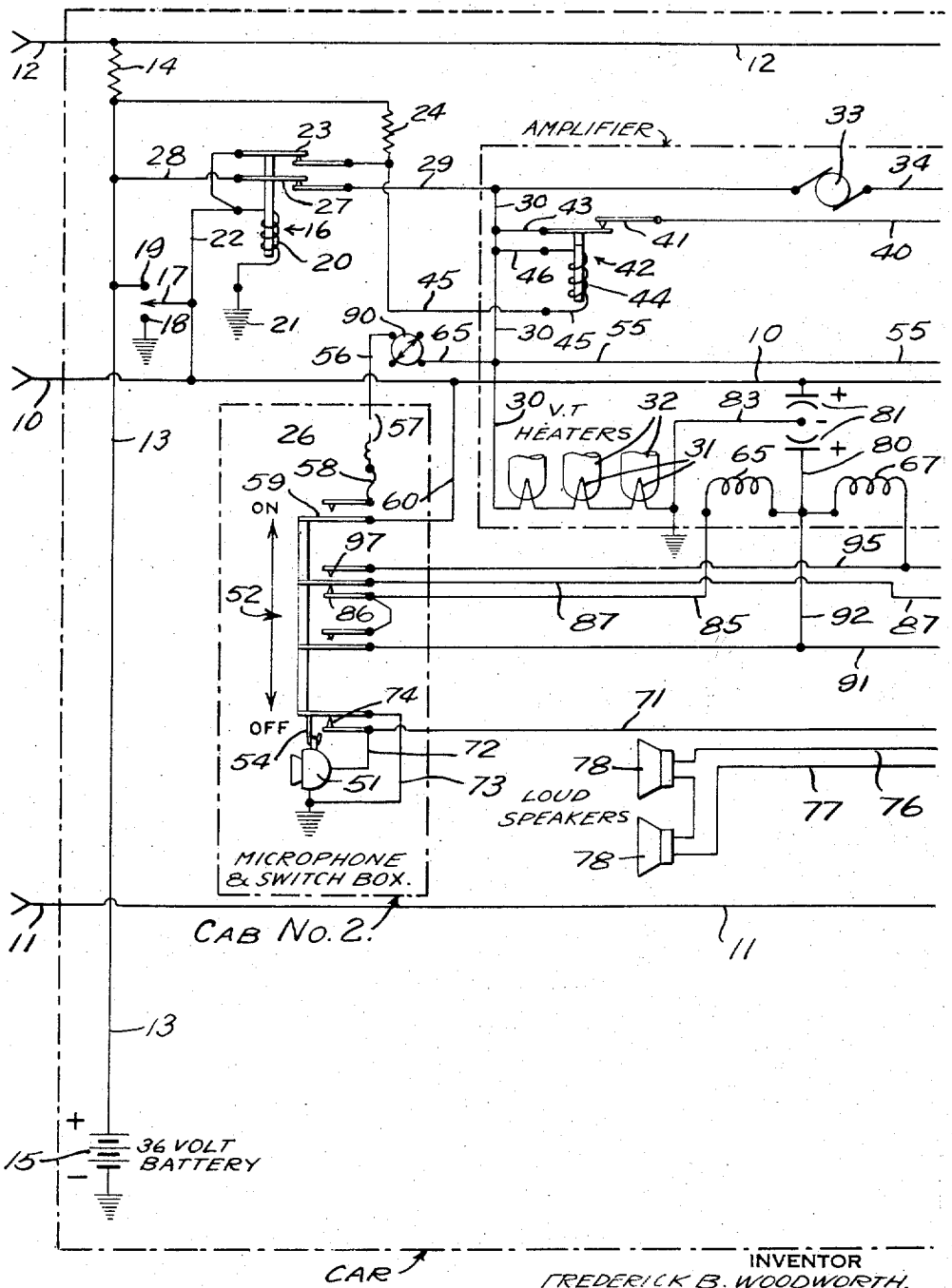

Matter enclosed in heavy brackets [ ] appears in the original patent but forms no part of this reissue specification; matter printed in italics indicates the additions made by reissue.

This invention relates to a public address system for subway trains or the like and more particularly to a system in which any one of a series of microphones may be selected by the conductor and used to operate loud speakers throughout the train.

An object of the invention is to provide a system of the above type wherein speakers and microphones are installed in each car and wherein any selected microphone may be used to operate all of the speakers.

Another object is to provide a system of the above type which utilizes already existing train lines for connecting microphones to actuate the speakers in the various cars.

Another object is to provide a system of the above type which can only be actuated by a conductor or a person having access to a key-actuated-controller.

Various other objects and advantages will be apparent as the nature of the invention is more fully disclosed.

Subway cars of the type to which the present invention applies are normally equipped with a plurality of lines including a heating line, a lighting line and a battery line, which lines are connected together through the usual coupling devices so that the various lines extend the entire length of the train. Each car is also provided with suitable heating and lighting relays which can be actuated from any one car by applying an actuating voltage from the battery line to the heating or lighting line.

In accordance with the present invention these existing lines and relays are utilized for connecting a microphone in any one car to actuate amplifiers and loud speakers which are located in each car. Microphones are installed in the various control cabs and an amplifier is installed in each car with its input normally connected across the heating and lighting lines of the car and its output connected to the loud speakers of that car. When one of the microphones is to be used, a microphone switch disconnects the input of the amplifier of that particular car from the heating and lighting lines and renders the microphone operative. At the same time the microphone switch connects the output of the amplifier of that particular car across the heating and lighting lines to supply an audio voltage to actuate the amplifiers and speakers of the remaining cars.

Suitable relay means are provided for energizing the amplifier heaters when the system is to be set up for operation and also for supplying plate voltage to the amplifiers when the microphone is to be used.

In one embodiment of the invention the speakers are placed beneath the seats of the car adjacent the doors so that the speakers are only heard on the station platform when the car doors facing that platform are open.

The nature of the invention will be better understood by referring to the following description, taken in connection with the accompanying drawings in which a specific embodiment thereof has been set forth for purposes of illustration.

Figure 2:
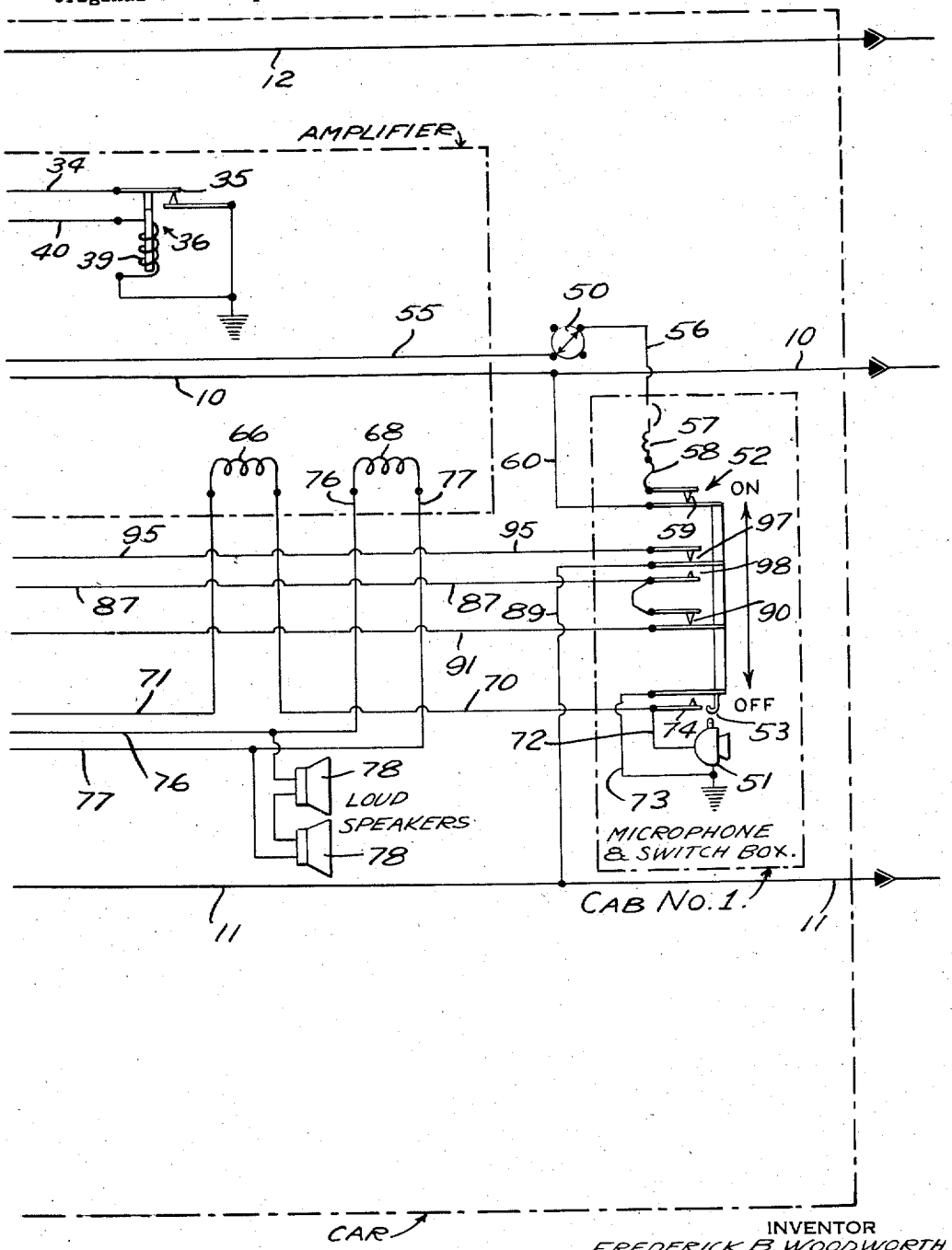

In the drawings:

Figs. 1 and 2 when placed side by side constitute a schematic circuit diagram of a public address system as embodied in a single car of the type above referred to.

Referring to the drawings, a heating line 10, a lighting line 11 and a battery line 12 are shown as extending the entire length of the car and as connected to couplers by which they are connected to similar lines in the adjacent cars of the train. Such lines and couplers are standard equipment and are used for operating the lighting and heating circuits of the train.

Each car also contains a local battery line 13 which is connected to the battery line 12 through a resistor 14 and is supplied from a 36 volt battery 15 or the like. The batteries 15 of the various cars are connected by the battery line 12 so as to make battery voltage available in any car in which the local battery may fail. Each car also contains a heater relay 16 and a control switch 17 having a grounded contact 18 and a contact 19 connected to the local battery line 13. The relay 16 has an actuating coil 20 one end of which is grounded at 21 and the other end of which is connected by a lead 22 to the movable contact of the switch 17 and also to the heating line 10. The relay 16 carries the heater contacts (not shown) which are adapted to energize the heating circuit of that particular car and also carries a holding contact 23 which is connected through a holding resistor 24 to the local battery line 13. The arrangement is such that when the heater circuits are to be set up, switch 17 is thrown to close the contact 19 and thereby supply battery voltage to the coil 20 to energize the coil and close the various contacts of the relay. At the same time battery voltage is supplied to the heater line 10 which feeds through the various cars and serves to similarly actuate the relays 16 in each car.

The closing of the holding contact 23 maintains the coil 20 energized from the battery line 13 through the holding resistor 24 which is adapted to cut down the voltage supplied to the coil 20 from the battery voltage of say 36 volts to a smaller holding voltage, for example, 20 volts. The relays 16 of all of the cars then remain closed until they are released by actuating the switch 17 in any one car to close the contact 18 which in effect short circuits the coils 20 and allows the relays to drop out. At the same time by grounding the heating line 10 the coils 20 in the other cars of the train are also shorted and the corresponding relays allowed to drop out, thereby deenergizing the heating circuits for all of the cars.

The relay 16 also carries contacts 27 which are connected by a line 28 to the local battery line 13 and by lines 29 and 30 to energize heaters 31 of amplifier tubes 32, thereby keeping the heaters energized while the relay 16 is closed, which as pointed out above is the normal position of the relay during the operation of the train.

The line 29 is also connected to drive a dynamotor 33 through line 34 and normally open contact 35 of a relay 36. The dynamotor 33 is not actuated however until the driving circuit is completed by energization of the relay 36. The dynamotor 33 is adapted to supply plate voltage to the amplifier tubes 32 so as to render the amplifier operative.

The winding 39 of the relay 36 is connected by line 40 to normally closed contact 41 of a relay 42 which is also connected by a line 43 and lines 30 and 29 through contact 27 of the relay 16 to the battery line 13. The relay 42 is provided with an actuating coil 44 one end of which is connected by a line 45 to the low voltage end of the holding resistor 24 and the other end of which is connected by a line 46 to the line 30 which receives the full battery voltage from the line 13. The coil 44 is thus connected across the resistor 24 and is supplied with a voltage corresponding to the voltage drop across the resistor 24 which in the above example may be of the order of 16 volts. This voltage actuates the relay 42 and opens the contact 41, thereby preventing the relay 36 from operating. Since the contacts 35 of relay 36 are normally open the dynamotor 33 normally does not operate. However, when the relay 42 is deenergized in the manner to be described the contact 41 is closed thereby supplying battery voltage through the line 40 to actuate the relay 36 and to close the contact 35 thus completing the driving circuit to the dynamotor 33. The motor then operates and supplies plate voltage for the amplifier.

The car in which this system is installed is assumed to have two cabs indicated on the drawings as cab No. 1 and cab No. 2, either of which may be used by the motorman for operating the train or by the conductor for operating the doors and the public address system. Each cab contains a key-actuated-controller 50 which is adapted when in the "off" position as shown in cab No. 2 in the drawings to break the various train-operating circuits so as to prevent unauthorized operation thereof. When the controller 50 is in "on" position as shown in cab No. 1 in the drawings, the various train-operating circuits (not shown) are set up for operation.

In accordance with this invention each cab also contains a microphone 51 and a microphone switch 52. The microphone switch 52 is normally in its down or "off" position as shown in cab No. 2 on the drawings but is shifted to the upper or "on" position as shown in cab No. 1 in the drawings when the microphone in that cab is to be used. The microphone switch 52 may be mechanically interconnected with the microphone 51 so as to be automatically actuated when the microphone is lifted for use and to be automatically restored to the "off" position when the microphone is replaced, for example, on a microphone hook 53. Since such automatic actuation is well known in the telephone art it is not described herein in detail.

Referring to cab No. 1 in the drawings, it is assumed that the microphone 51 has been removed from its hook for use by the conductor and that the microphone switch 52 has been shifted to the upper or "on" position, also that the controller 50 has been turned to the "on" position. A circuit is now completed from the line 30 which carries battery voltage, through a line 55 to the controller 50 of cab No. 1, then to line 56 of that cab and through breaker 57 and fuse 58 to contact 59 of the microphone switch 52 which is now closed, thence by a line 60 to the heating line 10, thereby supplying battery voltage to the heating line 10.

Since the heating line 10 is connected to the line 22 through contact 23 of relay 16 to the relay side of the holding resistance 24 it is evident that battery voltage is supplied to this point. Since the other side of the resistance 24 is already supplied with battery voltage from the local battery line 13, the voltage drop across this resistance is eliminated thereby applying the same voltage to the two ends of the winding 44 of the relay 42 and allowing that relay to drop out and close the contact 41. The closing of this contact 41 energizes the relay 36, thereby causing this relay to close its contact 35 and to complete the circuit to the dynamotor 33. The dynamotor then starts to operate and supplies plate voltage for the various amplifiers. Since the heating line 10 extends throughout the length of the train the voltage on this line throughout the train is raised to the battery voltage and the same operation takes place in all of the cars, thereby conditioning the amplifiers in all of the cars for operation.

It will be noted that the heating line 10 is normally operated at a voltage which is less than battery voltage due to the voltage drop through the holding resistor 24. The raising of the voltage on the heating line 10 to the battery voltage increases the voltage across the relay 16. However, since this relay is already energized this raising of the voltage does not affect the operation thereof, the only effect being to supply additional holding current to the relay 16 while the microphone is being operated.

The amplifier, the details of which are not shown since the amplifier is of standard form, is provided with two input transformers 65 and 66 and with two output transformers 67 and 68. The input transformer 66 is connected to the two microphones in series, the microphone 51 of cab No. 1 being connected by a line 70 to one side of the input transformer 66 and the microphone 51 of cab No. 2 being connected by a line 71 to the other side of said input transformer, the other sides of the respective microphones being grounded. In addition each microphone is connected by lines 72 and 73 across contact 74 of its microphone switch 52. The contacts 74 are arranged to be closed for short circuiting the microphone when the switch is in the down or "off" position and to be opened for activating the microphone when the switch 52 is in the up or "on" position. Hence both microphones of the car are normally shorted and rendered inoperative. When one of the microphones is lifted for use and its switch 52 is raised to the "on" position however the short circuit on that microphone is broken and the microphone is connected in circuit with the input transformer 66 of the amplifier of that car.

The output transformer 68 of the car amplifier is connected by leads 76 and 77 to actuate various loud speakers 78 of that car. Hence the speakers are actuated from the output of the amplifier whenever the amplifier is actuated either from the car microphone 51 as above described or from the train lines in the manner to be described.

The line input transformer 65 and the line output transformer 67 of the car amplifier are connected on one side through a line 80 and a pair of oppositely biased electrolytic condensers 81 in series, to the heating line 10. The junction of the two electrolytic condensers 81 is grounded through lines 83 so as to maintain a constant polarizing voltage on the condensers.

When both microphone switches 52 are in the "off" position the other side of the line input transformer 65 is connected to the lighting line 11 through a line 85, closed contact 86 of the microphone switch 52 in cab No. 2, line 87, closed contact 86 of microphone switch 52 in cab No. 1, and line 89 to lighting line 11. When either of the microphone switches 52 is in the "on" position the contact 86 of the respective microphone switch 52 is broken to disconnect the winding 65 from the line 11 and a circuit is completed through closed contact 90 of that switch 52 and line 92 to the first side of the input winding 65, thereby short circuiting said winding. Hence the winding is disconnected and short circuited whenever one of the microphones in that car is lifted for use and the amplifier in that particular car is no longer responsive to signals received over the train lines but is responsive only to a microphone in that car.

The other side of the line output transformer 67 of the car amplifier is connected to a line 95 which is connected to the contacts 97 of both microphone switches 52. The contacts 97 are normally open when the microphone switches are in the "off" position but are closed when the microphone switches are in their "on" position. When the microphone switch 52 of cab No. 1 is in the on position its contact 97 is connected through line 89 to the lighting line 11, thereby connecting the output transformer 67 across the train lines 10 and 11. When the microphone switch 52 in cab No. 1 is in the "off" position and the microphone switch 52 of cab No. 2 is in the "on" position the contact 97 of microphone switch 52 in cab No. 2 is connected by a line 87 to contact 98 of switch 52 of cab No. 1 which is now closed, thence through line 89 to the lighting line 11. Hence if either of the microphone switches of the particular car are in their raised or "on" position the line output transformer 67 is connected across the train lines 10 and 11 to supply audio signals across those two lines for operating the amplifiers in the other cars which as pointed out above are normally connected across the train lines 10 and 11.

The lighting line 11 is supplied as standard equipment with relays similar to the relay 16 above described which are actuated to set up the various lighting circuits in the cars. Such relays being standard equipment and forming no part of the present circuit are not described herein.

It will be noted that the present system provides means for operating the loud speakers in all of the cars from any one of the cabs and for starting the dynamotors in all of the cars for energizing the various amplifier circuits whenever any one of the microphones is lifted. The system also provides for automatically setting up the heating circuit to the amplifier in each car when the heating relays 16 are actuated.

In normal operation the line input of each car amplifier is connected across the heating and lighting lines 10 and 11 so as to actuate the loud speakers in response to signals received over said lines. When one of the microphones is lifted for use, however, in addition to energizing the various amplifiers in all of the cars, the microphone switch which has been actuated serves to disconnect the line input winding of the amplifier of that car from the train line and to short circuit the winding so as to prevent pick-up from the train line. The switch also serves to connect the line output winding of that particular amplifier across the train line so as to supply the audio signal not only to the speakers of that particular car but to the speakers of all of the other cars.

It is to be particularly noted that the system utilizes only existing lines which are normally present as standard equipment in cars of the type to which this invention applies. The additional equipment required in each car in order to install the present system is the amplifier and associated circuits, including the dynamotor and relays, the microphone and microphone switch. The normal train circuits are not disturbed in any way.

The system is particularly applicable to subway trains of the type wherein each car is provided with two cabs and wherein one cab on the train is selected by the conductor for use in operating the train doors and speakers.

What is claimed is:

1. In a public address system for trains composed of a plurality of cars having a pair of train lines coupled to extend through all of said cars, loud speaker means in each car, an audio amplifier in each of said cars having an output circuit connected to said loud speaker means and having a second output circuit connected across said train lines, a microphone in at least one of said cars, a microphone switch to be actuated between "on" and "off" position, said amplifier having an input circuit connected to said microphone and a second input circuit connected across said train lines, and contact means actuated by said microphone switch to disconnect said second input circuit from said train line when said switch is in the "on" position and to disconnect said second output circuit from said train line when said switch is in the "off" position.

2. In a public address system for trains composed of a plurality of cars having a pair of train lines coupled to extend through all of said cars, loud speaker means in each car, an audio amplifier in each of said cars having an output circuit connected to said loud speaker means and having a second output circuit connected across said train lines, a microphone in at least one of said cars, a microphone switch to be actuated between "on" and "off" position, said amplifier having an input circuit connected to said microphone and a second input circuit connected across said train lines, and contact means actuated by said microphone switch to disconnect said second input circuit from said train line when said switch is in the "on" position and to disconnect said second output circuit from said train line when said switch is in the "off" position, and additional contact means on said switch for energizing said amplifier when said switch is on the "on" position.

3. A public address system for a railway car, comprising a pair of train lines to be coupled to adjacent cars of the train, an audio amplifier having a pair of input circuits and a pair of output circuits, a pair of microphones and a pair of microphone switches normally in "off" position and adapted to be placed in "on" position for actuation of the respective microphones, circuit means connecting said microphones in series across one of said amplifier input circuits, contact means on said microphone switches to short circuit the respective microphones when said switch is in "off" position, circuit means connecting said second amplifier input circuit across said train lines, contact means on said microphone switches to disconnect said second amplifier input circuit from said train lines, when one of said switches is in "on" position, loud speaker means disposed in said car and connected to one of said amplifier output circuits, circuit means including contact means on said microphone switches adapted to connect said second amplifier output circuit across said train line when one of said microphone switches is in "on" position and to disconnect said second output circuit from said train line when said microphone switches are both in "off" position.

4. A public address system for a railway car, comprising a pair of train lines to be coupled to adjacent cars of the train, a voltage source, relay means connected to one of said lines, means connecting said voltage source to actuate said relay, a holding circuit for said relay including a holding resistor across which a voltage drop is developed, an audio amplifier having a pair of input circuits and a pair of output circuits and having high voltage and low voltage energizing circuits, means responsive to actuation of said relay to apply low voltage from said source to said low voltage energizing circuit, a pair of microphones and a pair of microphone switches normally in "off" position and adapted to be placed in "on" position for actuation of the respective microphones, circuit means connecting said microphone in series across one of said amplifier input circuits, contact means on said microphone switches to short circuit the respective microphones when said switch is in "off" position, circuit means connecting said second amplifier input circuit across said train lines, contact means on said microphone switches to disconnect said second amplifier input circuit from said train lines, when one of said switches is in "on" position, loud speaker means disposed in said car and connected to one of said amplifier output circuits, circuit means including contact means on said microphone switches adapted to connect said second amplifier output circuit across said train line when one of said microphone switches is in "on" position and to disconnect said second output circuit from said train line when said microphone switches are both in "off" position, a dynamotor connected to supply said high operating voltage to said amplifier, circuit means connecting said low voltage source to actuate said dynamotor, relay means responsive to the voltage drop across said holding resistor to interrupt said last circuit means and prevent actuation of said dynamotor and means actuated by said microphone switch to reduce the voltage drop across said holding resistor for thereby actuating said last relay means for energizing said dynamotor supply circuit when said microphone switch is in "on" position.

5. A public address system for a railway car, comprising a pair of train lines to be coupled to adjacent cars of a train, a voltage source, relay means connected to one of said train lines, means connecting said voltage source to actuate said relay, a holding circuit for said relay including a resistor across which a voltage drop is developed, an audio amplifier having high voltage and low voltage energizing circuits, means responsive to actuation of said relay to apply low voltage from said source to said low voltage energizing circuit, a dynamotor connected to supply said high operating voltage to said amplifier, circuit means connecting said low voltage source to actuate said dynamotor, means responsive to the voltage drop across said holding resistor to interrupt said last circuit means and prevent actuation of said dynamotor, and switch means to reduce the voltage drop across said holding resistor for thereby actuating said last relay means for energizing said dynamotor supply circuit.

6. A public address system for a railway car, comprising a pair of train lines to be coupled to adjacent cars of a train, a voltage source, relay means connected to one of said train lines, means connecting said voltage source to actuate said relay, a holding circuit for said relay including a resistor across which a voltage drop is developed, an audio amplifier having high voltage and low voltage energizing circuits, means responsive to actuation of said relay to apply low voltage from said source to said low voltage energizing circuit, a microphone and a microphone switch normally in "off" position and adapted to be placed in "on" position for actuation of the microphone, an amplifier having an input circuit and an output circuit, circuit means connecting said microphone across said input circuit for actuation of said amplifier, contact means on said microphone switch to short circuit the microphone when said switch is in "off" position, circuit means connecting said amplifier input circuit across said train line, when said microphone switch is in "off" position, contact means on said microphone switch to disconnect said input circuit from said train line when said switch is in "on" position, loud speaker means disposed in said car and connected to said amplifier output circuit, circuit means including contact means on said microphone switch adapted to connect said amplifier output circuit across said train lines when said microphone switch is in "on" position and to disconnect said output circuit from said train line when said microphone switch is in "off" position, a dynamotor connected to supply said high operating voltage to said amplifier, circuit means connecting said low voltage source to actuate said dynamotor, means responsive to the voltage drop across said holding resistor to interrupt said last circuit means and prevent actuation of said dynamotor, and switch means to reduce the voltage drop across said holding resistor for thereby actuating said last relay means for energizing said dynamotor supply circuit.

*7. In a public address system for trains composed of a plurality of cars having a train line coupled to extend through all of said cars, a loud speaker in each car, an audio amplifier in each of said cars having output means connected to said loud speaker and to said train line, a microphone in at least one of said cars, a microphone switch to be actuated between "on" and "off" position, said amplifier having input means connected to said microphone and to said train line, and contact means actuated by said microphone switch to disconnect said input means from said train line when said switch is in the "on" position and to disconnect said output means from said train line when said switch is in the "off" position.*

*8. A control system for a railway car having a pair of lines adapted to be coupled to corresponding lines in adjacent cars, comprising a voltage source connected to supply a voltage to one of said lines, a relay having a coil connected to the other of said lines, manual switch means to connect said first line to said second line for applying voltage from said source to said relay coil for actuating said relay, a holding circuit for said relay including a holding resistor and relay contacts connecting said holding circuit to said first line for supplying a holding current from said source through said resistor, whereby a voltage drop is developed across said resistor,*

*a voltage responsive element, connections supplying said voltage drop to said element, and switch means to apply to said second line a voltage adapted to alter said voltage drop in a sense to actuate said element.*

*9. A control system for a railway train having at least two cars comprising in each car a pair of train lines coupled to corresponding lines in adjacent cars, a voltage source connected to supply a given voltage to one of said lines, a relay having a coil connected to the other of said lines and having a holding circuit including a holding resistor and relay contacts to connect said holding circuit to said first line for supplying therefrom holding current through said resistor whereby a voltage drop is developed across said resistor, switch means to connect said first line to said second line for actuating the relays in all of said cars, a voltage responsive element in each of said cars, connections supplying said voltage drop to said element, and switch means to apply to said second line a voltage adapted to alter said voltage drop in a sense to actuate said elements in all of said cars.*

*10. A system as set forth in claim 8 in which said element is a normally inoperative amplifier and said change in voltage drop across said resistor is adapted to render said amplifier operative.*

*11. A public address system for a railway train having at least two cars, comprising in each car a battery line and a pair of train lines adapted to be coupled to corresponding lines in adjacent cars, a battery connected to supply a given voltage to said battery line, a relay having a coil connected to one of said train lines and a holding circuit including a holding resistor and relay contacts connecting said holding circuit to said battery line to supply holding current through said holding circuit whereby a voltage drop is developed across said resistor, switch means to connect said battery line to said first train line for supplying thereto a voltage to actuate said relays in all of said cars, each car having a loud speaker, a microphone and a microphone switch to be actuated to render the corresponding microphone operative, and a normally inoperative amplifier having input and output circuit means, circuit means responsive to a reduction in the voltage drop across said resistor to render said amplifier operative, means actuated by said microphone switch to supply a voltage from said battery line to said first train line to cause a reduction in the voltage drop across the resistor in all of said cars for rendering all of said amplifiers operative, means actuated by said microphone switch to energize said input circuit means from said train lines when said microphone is rendered inoperative and from said microphone when the latter is rendered operative, means connecting said output circuit means to actuate said loudspeaker and means to connect said output circuit means to energize said train lines when said microphone is rendered operative, whereby the actuator of any microphone switch enables its microphone to actuate the loud speakers in all of said cars and the restoration of said microphone switch renders inoperative the amplifiers in all of said cars.*

*12. In a system as set forth in claim 11, a circuit breaker in the circuit from each microphone switch between the battery line and the first train line.*

*13. A public address system for a railway train comprising a pair of train lines adapted to be coupled to corresponding lines in adjacent cars of the train, a voltage source, relay means connected to one of said train lines, means connecting said voltage source to actuate said relay means, a holding circuit for said relay means, including a resistor across which a voltage drop is developed, a normally inoperative audio amplifier and means responsive to a change in the voltage drop across said resistor to render said amplifier operative.*

*14. A public address system for a railway train comprising a pair of train lines adapted to be coupled to corresponding lines in adjacent cars of the train, a voltage source, relay means connected to one of said train lines,*

*means connecting said voltage source to actuate said relay means, a holding circuit for said relay means including a resistor across which a voltage drop is developed, a normally inoperative audio amplifier and means responsive to a change in the voltage drop across said resistor to render said amplifier operative, and a microphone switch, and means responsive to the actuation of said switch to alter said voltage drop whereby said amplifier is rendered operative upon actuation of said microphone switch.*

*15. A voltage control system comprising a voltage line and an operating line, a relay having a pair of contacts and a coil connected to said operating line and adapted to be initially energized thereby, a holding resistor, one end of said holding resistor being connected to said voltage line and the other end of said resistor being connectable through the contacts of said relay to said coil and to said operating line, a switching circuit disposed in parallel with the holding resistor connection to said operating line, said switching circuit being adapted thereby to place the potential of said voltage line on said operating line and the said other end of the holding resistor, a normally inoperative control circuit and means responsive to a change in the voltage drop across said holding resistor to render said control circuit operative.*

*16. A voltage control system as claimed in claim 15 wherein said control circuit is an amplifier circuit and said switching circuit includes a make and break device.*

*17. A voltage control system as claimed in claim 16 wherein said make and break device is in said amplifier circuit, and there is provided an external circuit, the input and output side of the amplifier being selectively connected into said external circuit according to the state of said make and break device.*

*18. A voltage control system as claimed in claim 17 wherein a circuit breaker is included in said switching circuit.*

References Cited in the file of this patent or the original patent

UNITED STATES PATENTS 2,495,749 Mayle ---------- Jan. 31, 1950